US012809577B2

(12) United States Patent
Onaka

(10) Patent No.: US 12,809,577 B2
(45) Date of Patent: Nov. 24, 2026

(54) CONTROL SYSTEM AND HEAD-MOUNTED DISPLAY

(71) Applicant: HONDA MOTOR CO., LTD., Tokyo (JP)

(72) Inventor: Junichiro Onaka, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 103 days.

(21) Appl. No.: 19/063,957

(22) Filed: Feb. 26, 2025

(65) Prior Publication Data

US 2025/0284454 A1 Sep. 11, 2025

(30) Foreign Application Priority Data

Mar. 6, 2024 (JP) ................................ 2024-034094

(51) Int. Cl.

*G06F 3/16* (2006.01)
*G02B 27/01* (2006.01)
*G06F 3/01* (2006.01)

(52) U.S. Cl.

CPC ......... *G06F 3/165* (2013.01); *G02B 27/0172* (2013.01); *G06F 3/017* (2013.01); *G02B 2027/0138* (2013.01)

(58) Field of Classification Search

CPC ..... G06F 3/165; G06F 3/017; G02B 27/0172; G02B 2027/0138
See application file for complete search history.

(56) References Cited

U.S. PATENT DOCUMENTS

| | | | | |
|---|---|---|---|---|
| 6,518,939 | B1 * | 2/2003 | Kikuchi | H04N 13/398 463/31 |
| 2021/0055910 | A1 | 2/2021 | Takahashi et al. | |
| 2023/0236664 | A1 * | 7/2023 | Furugori | B60K 35/10 |
| 2023/0347903 | A1 * | 11/2023 | Katz | G06V 20/597 |

FOREIGN PATENT DOCUMENTS

| | | | |
|---|---|---|---|
| JP | 7243639 | B2 | 3/2023 |

* cited by examiner

*Primary Examiner* — Andrew Sniezek
(74) *Attorney, Agent, or Firm* — Carrier, Shende & Associates P.C.; Joseph P. Carrier; Fulchand P. Shende

(57) ABSTRACT

A control system includes: a head-mounted display that is worn by a user riding in a vehicle, and provides the user with at least a display image corresponding to an image acquired by a vehicle exterior camera that is provided in the vehicle and captures an image of the periphery of the vehicle; a detection unit that detects a gesture performed by the user, based on an image acquired by a vehicle interior camera that is provided in the vehicle and captures an image of the interior of a vehicle cabin; and a volume control unit that executes control of adjusting the volume of a speaker provided in the head-mounted display based on the gesture detected by the detection unit.

7 Claims, 9 Drawing Sheets

CONTROL SYSTEM AND HEAD-MOUNTED DISPLAY

CROSS-REFERENCE TO RELATED APPLICATIONS

This application is based upon and claims the benefit of priority from Japanese Patent Application No. 2024-034094 filed on Mar. 6, 2024, the contents of which are incorporated herein by reference.

BACKGROUND OF THE INVENTION

Field of the Invention

The present disclosure relates to a control system and a head-mounted display.

Description of the Related Art

JP 7243639 B2 discloses an information processing apparatus in which a headphone and a smartphone are capable of wirelessly communicating with each other. In the information processing apparatus, the headphone includes a motion sensor capable of detecting the behavior of a user. The smartphone can be operated in response to the behavior of the user detected by the motion sensor. The smartphone can provide a game, a video, and the like to the user.

SUMMARY OF THE INVENTION

JP 7243639 B2 merely discloses that the smartphone is operated in response to the behavior of the user detected by the motion sensor provided in the headphone. In recent years, there has been a demand for technologies that enable a head-mounted display to be used satisfactorily in a vehicle cabin.

The present invention has the object of solving the aforementioned problem.

A control system according to a first aspect of the present disclosure comprises: a head-mounted display that is worn by a user riding in a vehicle, the head-mounted display being configured to provide the user with at least a display image corresponding to an image acquired by a vehicle exterior camera provided in the vehicle and configured to capture an image of a periphery of the vehicle; a detection unit configured to detect a gesture performed by the user, based on an image acquired by a vehicle interior camera provided in the vehicle and configured to capture an image of an interior of a vehicle cabin; and a volume control unit configured to execute control of adjusting a volume of a speaker provided in the head-mounted display, based on the gesture detected by the detection unit.

A head-mounted display according to a second aspect of the present disclosure is worn by a user riding in a vehicle, the head-mounted display comprising: a display unit configured to provide the user with at least a display image corresponding to an image acquired by a vehicle exterior camera provided in the vehicle and configured to capture an image of a periphery of the vehicle; a speaker configured to provide the user with a sound; a detection unit configured to detect a gesture performed by the user, based on an image acquired by a vehicle interior camera provided in the vehicle and configured to capture an image of an interior of a vehicle cabin; and a volume control unit configured to execute control of adjusting a volume of the speaker based on the gesture detected by the detection unit.

According to the present invention, the head-mounted display can be used satisfactorily in the vehicle cabin.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

It is desirable that a head-mounted display allows a user to be immersed in content such as a game or a video.

Both eyes of the user wearing the head-mounted display are covered with the display surface of the head-mounted display. Therefore, the user wearing the head-mounted display in the vehicle cabin cannot see the scenery outside the vehicle. When the vehicle travels in this state, the user may feel motion sickness.

The embodiment described herein makes it less likely that the sense of immersion of the user in content such as a game or a video will be impaired. In addition, the embodiment described herein suppresses motion sickness of the user wearing a head-mounted display in a vehicle cabin.

1. Configuration of Control System 12

Figure 1:
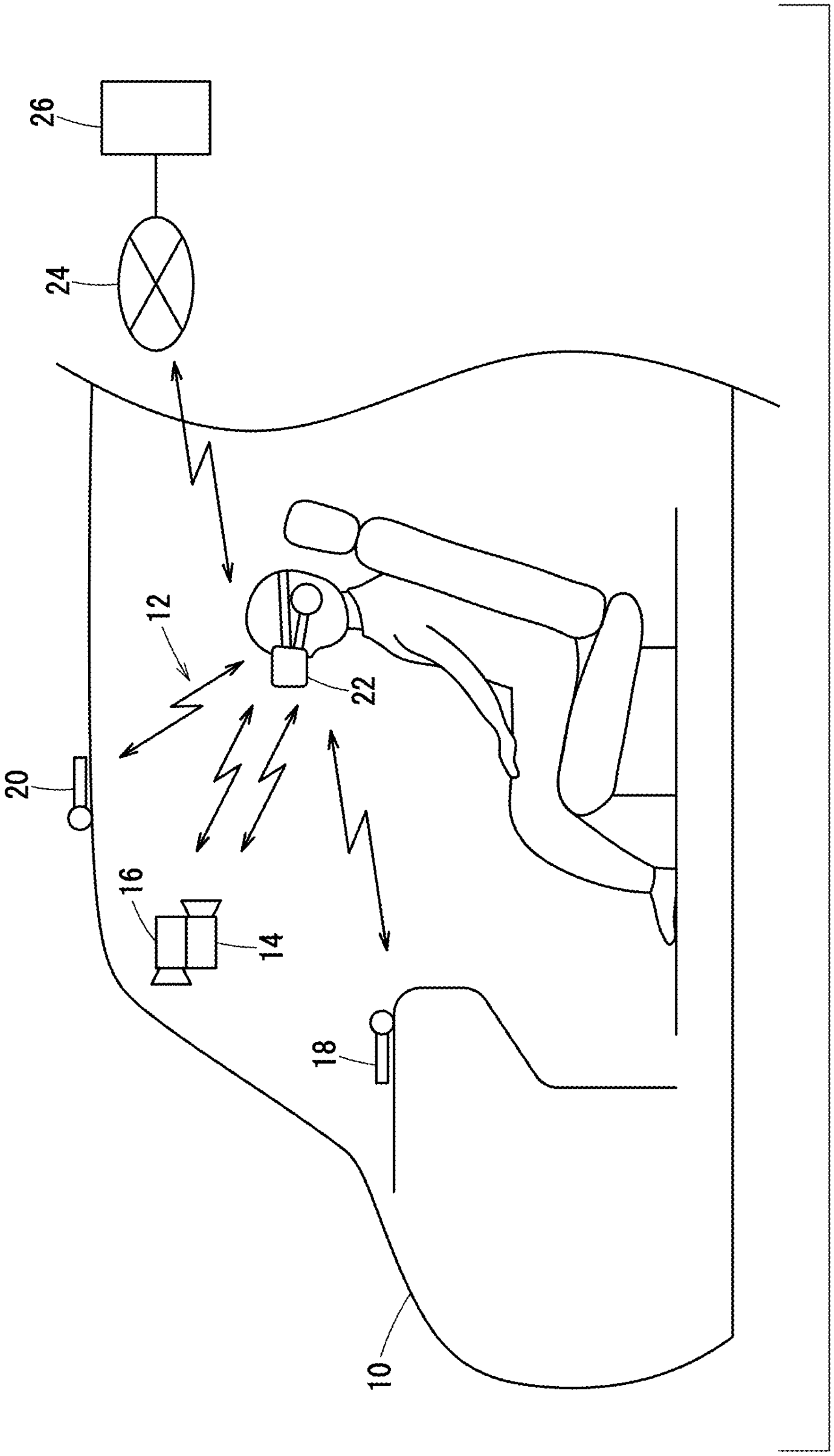
FIG. 1 is a schematic configuration diagram of a control system according to an embodiment of the present invention.

FIG. 1 is a schematic configuration diagram of a control system 12 according to an embodiment of the present invention. The control system 12 adjusts the volume of a head-mounted display 22 in response to a gesture made by an occupant wearing the head-mounted display 22 among occupants riding in a vehicle 10. It should be noted that, in the present specification, the occupant wearing the head-mounted display 22 is referred to as a user U.

The control system 12 includes a vehicle interior camera 14, a vehicle exterior camera 16, one or more vehicle interior microphones 18, a vehicle exterior microphone 20, and the head-mounted display 22. The vehicle interior camera 14 and the head-mounted display 22 can perform wireless communication with each other. The vehicle exterior camera 16 and the head-mounted display 22 can perform wireless communication with each other. The plurality of vehicle interior microphones 18 and the head-mounted display 22 can perform wireless communication with each other. The vehicle exterior microphone 20 and the head-mounted display 22 can perform wireless communication with each other. It should be noted that the head-mounted display 22 can communicate with a server device 26 via a communication line 24 such as the Internet.

The vehicle interior camera 14 captures an image of the interior of the vehicle cabin of the vehicle 10. The vehicle interior camera 14 transmits a vehicle interior image signal indicating the acquired vehicle interior image to the head-mounted display 22. It should be noted that the vehicle interior camera 14 may be provided in plurality.

The vehicle exterior camera 16 captures an image of the surroundings of the vehicle 10. The vehicle exterior camera 16 transmits a vehicle exterior image signal indicating the acquired vehicle exterior image to the head-mounted display 22. It should be noted that the vehicle exterior camera 16 may be provided in plurality.

Each of the plurality of vehicle interior microphones 18 is disposed in the vehicle cabin of the vehicle 10. For example, any one of the vehicle interior microphones 18 is disposed around each seat of the vehicle 10. The vehicle interior microphones 18 each acquire a sound around the seat where the vehicle interior microphone 18 is disposed. Each of the vehicle interior microphones 18 transmits an acoustic signal indicating the acquired sound to the head-mounted display 22.

The vehicle exterior microphone 20 is disposed outside the vehicle 10. The vehicle exterior microphone 20 acquires a sound outside the vehicle. The vehicle exterior microphone 20 transmits an acoustic signal indicating the acquired sound to the head-mounted display 22. It should be noted that the vehicle exterior microphone 20 may be provided in plurality.

Figure 2:
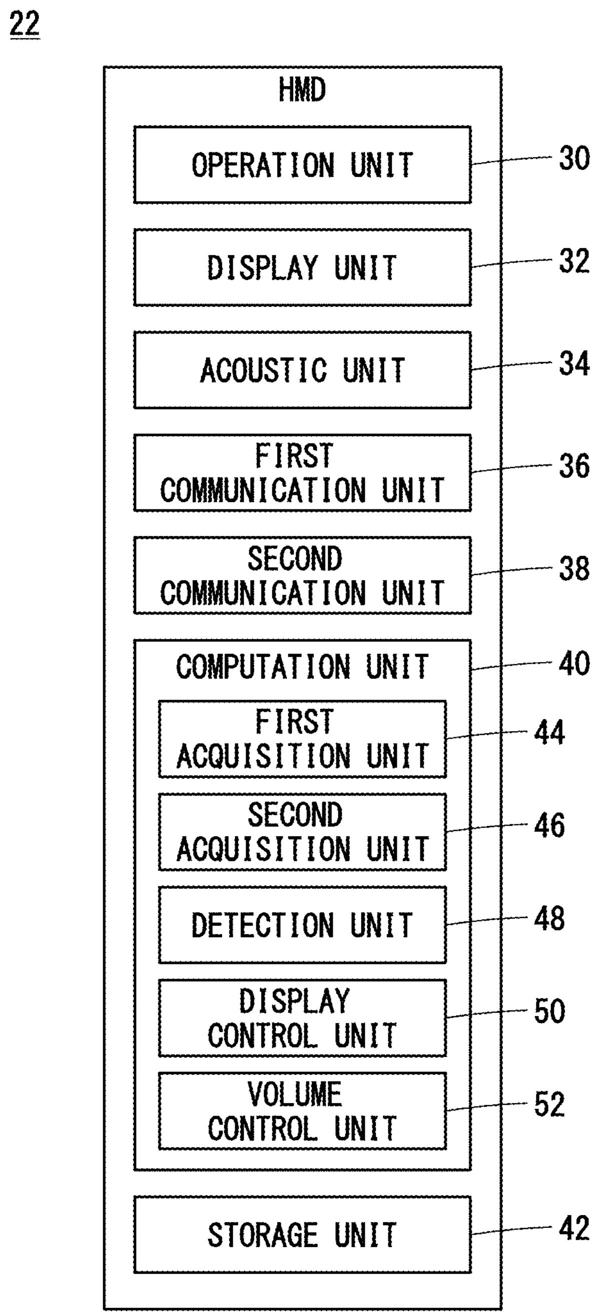
FIG. 2 is a functional block diagram of a head-mounted display.

FIG. 2 is a functional block diagram of the head-mounted display 22. In the present specification, the head-mounted display 22 is also referred to as an HMD 22. The HMD 22 includes an operation unit 30, a display unit 32, an acoustic unit 34, a first communication unit 36, a second communication unit 38, a computation unit 40, and a storage unit 42.

The operation unit 30 is a human machine interface with which the user U can perform an input operation. The operation unit 30 may be constituted by a remote controller, a switch, or the like. The operation unit 30 outputs an operation signal corresponding to an operation performed by the user U, to the computation unit 40.

The display unit 32 may be constituted by, for example, a display device. The display surface of the display device is close to both eyes of the user U. The display unit 32 displays (projects) a display image on the display surface based on an image signal transmitted from the computation unit 40. The display unit 32 can provide the user U with a display image of the digital content, and provide the user U with a display image outside the vehicle. For example, the display unit 32 can display content related to augmented reality, mixed reality, or the like.

The acoustic unit 34 may be constituted by, for example, an audio device. The speaker (including a headphone and an earphone) of the acoustic unit 34 is close to an ear 62 (FIG. 4A, FIG. 4B, or the like) of the user U. The acoustic unit 34 outputs a sound from the speaker based on an acoustic signal transmitted from the computation unit 40. The acoustic unit 34 can provide the user U with the sound of the digital content and provide the user U with the sound in the vehicle.

The first communication unit 36 may be constituted by, for example, a communication module (an integrated circuit module) including an antenna and the like. The first communication unit 36 receives signals transmitted from the vehicle interior camera 14, the vehicle exterior camera 16, the plurality of vehicle interior microphones 18, and the vehicle exterior microphone 20, and outputs the signals to the computation unit 40.

The second communication unit 38 may be constituted by, for example, a communication module (an integrated circuit module) including an antenna and the like. The second communication unit 38 receives a digital content signal transmitted from the server device 26 via the communication line 24, and outputs the digital content signal to the computation unit 40.

The computation unit 40 may be constituted by a processor such as a central processing unit (CPU) or a graphics processing unit (GPU). That is, the computation unit 40 may be constituted by processing circuitry. At least part of the computation unit 40 may be realized by an integrated circuit such as an application specific integrated circuit (ASIC) or a field-programmable gate array (FPGA). At least part of the computation unit 40 may be realized by an electronic circuit including a discrete device.

The computation unit 40 includes a first acquisition unit 44, a second acquisition unit 46, a detection unit 48, a display control unit 50, and a volume control unit 52. The first acquisition unit 44, the second acquisition unit 46, the detection unit 48, the display control unit 50, and the volume control unit 52 can be realized by the computation unit 40 executing a program stored in the storage unit 42.

The first acquisition unit 44 acquires, via the first communication unit 36, the vehicle interior image signal output from the vehicle interior camera 14. Further, the first acquisition unit 44 acquires, via the first communication unit 36, the vehicle exterior image signal output from the vehicle exterior camera 16. In addition, the first acquisition unit 44 acquires, via the first communication unit 36, the acoustic signal output from each of the vehicle interior microphones 18. Further, the first acquisition unit 44 acquires, via the first communication unit 36, the acoustic signal output from the vehicle exterior microphone 20. On the other hand, the second acquisition unit 46 acquires, via the second communication unit 38, the digital content signal output by the server device 26.

The detection unit 48 detects a gesture performed by the user U, based on the vehicle interior image signal acquired by the first acquisition unit 44. For example, the detection unit 48 detects the user U wearing the HMD 22 by image recognition. Further, the detection unit 48 detects the position of a hand 64 (FIG. 4A, FIG. 4B, or the like) of the user U and the movement of the fingers of the user U by gesture recognition.

The display control unit 50 causes the display unit 32 to display a display image corresponding to the vehicle exterior image signal acquired by the first acquisition unit 44. Further, the display control unit 50 causes the display unit 32 to display a display image corresponding to the digital content signal acquired by the second acquisition unit 46. The display control unit 50 can execute control of causing the display unit 32 to display the display image of the digital content and the display image of the vehicle exterior in a superimposed manner. The display control unit 50 can control the display unit 32 based on the operation signal output by the operation unit 30.

The volume control unit 52 causes the acoustic unit 34 to output a sound corresponding to the acoustic signal acquired by the first acquisition unit 44. Further, the volume control unit 52 causes the acoustic unit 34 to output a sound corresponding to the digital content signal acquired by the second acquisition unit 46. The volume control unit 52 can execute control of causing the acoustic unit 34 to simultaneously output the sound of the digital content, the sound inside the vehicle cabin, and the sound outside the vehicle. The volume control unit 52 can execute control of adjusting the volume of the speaker of the acoustic unit 34 based on the gesture detected by the detection unit 48. The volume control unit 52 can execute control of adjusting the volume of digital content based on the operation signal output by the operation unit 30.

The storage unit 42 is a computer-readable storage medium. The storage unit 42 is constituted by a volatile memory (not shown) and a non-volatile memory (not shown). The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least part of the storage unit 42 may be included in the processor, the integrated circuit, or the like described above.

2. Volume Adjustment Process

Figure 3:
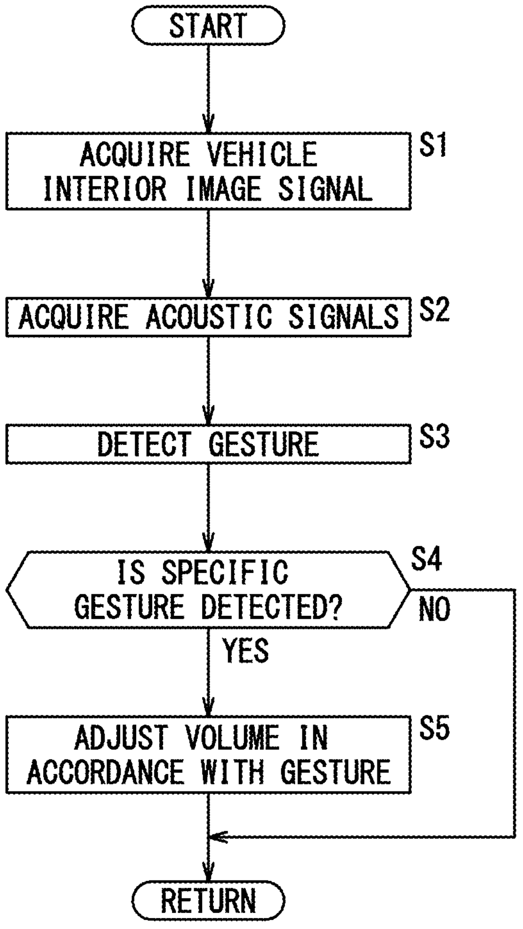
FIG. 3 is a flowchart of a volume adjustment process.

FIG. 3 is a flowchart of a volume adjustment process. The volume adjustment process described below is performed by the computation unit 40 of the HMD 22 at predetermined time intervals. The volume adjustment process described below is a process for adjusting the volume of the sound inside the vehicle cabin and the volume of the sound outside the vehicle, among the sounds output by the acoustic unit 34.

In step S1, the first acquisition unit 44 acquires a vehicle interior image signal from the vehicle interior camera 14 via the first communication unit 36. In step S2, the first acquisition unit 44 acquires acoustic signals from the plurality of vehicle interior microphones 18 and the vehicle exterior microphone 20 via the first communication unit 36. In step S3, the detection unit 48 detects a gesture performed by the user U, based on the vehicle interior image signal acquired in step S1.

In step S4, the detection unit 48 determines whether or not a specific gesture is detected. Examples of the specific gesture that can be detected in the present embodiment will be described later. In a case where the specific gesture is detected (step S4: YES), the process proceeds to step S5. On the other hand, in a case where the specific gesture is not detected (step S4: NO), the process returns to step S1.

In step S5, the volume control unit 52 adjusts one of the volume of the sound inside the vehicle or the volume of the sound outside the vehicle in accordance with the gesture detected by the detection unit 48. The speaker of the acoustic unit 34 outputs a sound at a volume corresponding to the control of the volume control unit 52.

3. Example of Specific Gesture and Volume Adjustment

In the present embodiment, in a case where the detection unit 48 detects a specific gesture performed by the user U, the volume control unit 52 can increase or decrease the volume of the sound inside or outside the vehicle output by the acoustic unit 34.

3-1. First Volume Adjustment Example

In the first volume adjustment example, the volume control unit 52 increases or decreases the volume of the sound acquired by the plurality of vehicle interior microphones 18 and the volume of the sound acquired by the vehicle exterior microphone 20, among the volumes output by the acoustic unit 34.

Figure 4A:
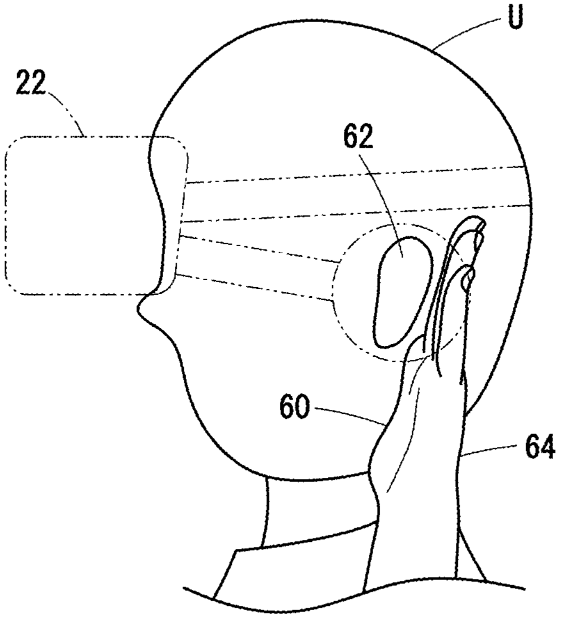
FIG. 4A is a diagram showing a user performing a first gesture.
Figure 4B:
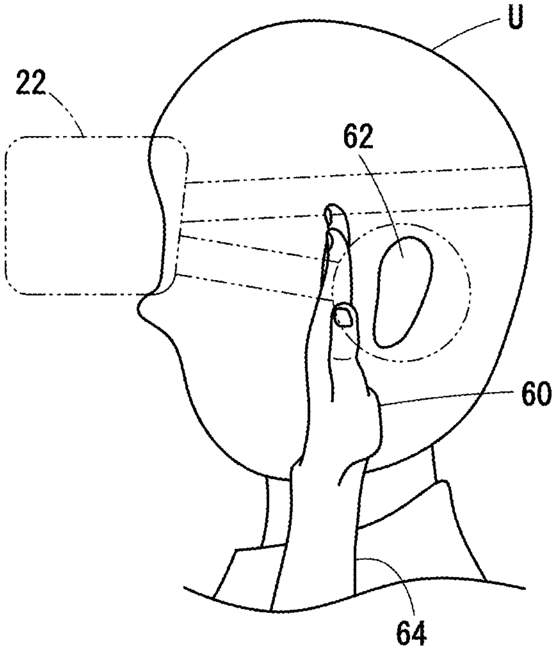
FIG. 4B is a diagram showing the user performing a second gesture.

As shown in FIGS. 4A and 4B, the user U can perform a gesture of positioning a palm 60 around the ear 62 without covering the ear 62 with the palm 60. For example, as shown in FIG. 4A, the user U can perform a first gesture of directing the palm 60 toward the front of the head and positioning the palm 60 behind the ear 62. Further, as shown in FIG. 4B, the user U can perform a second gesture of directing the palm 60 toward the rear of the head and positioning the palm 60 in front of the ear 62. In a case where the first gesture or the second gesture is detected by the detection unit 48, the volume control unit 52 increases the volume of the sound acquired by the plurality of vehicle interior microphones 18 and the volume of the sound acquired by the vehicle exterior microphone 20, among the volumes output by the acoustic unit 34.

Figure 5:
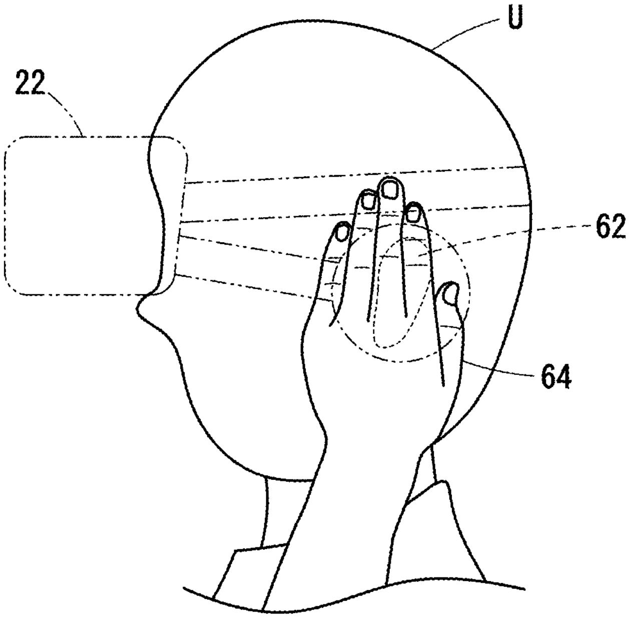
FIG. 5 is a diagram showing the user performing a third gesture.

As shown in FIG. 5, the user U can perform a third gesture of covering the ear 62 with the hand 64. In a case where the third gesture is detected by the detection unit 48, the volume control unit 52 decreases the volume of the sound acquired by the plurality of vehicle interior microphones 18 and the volume of the sound acquired by the vehicle exterior microphone 20, among the volumes output by the acoustic unit 34.

3-2. Second Volume Adjustment Example

In the second volume adjustment example, the volume control unit 52 selectively increases or decreases the volume of the sound acquired by the plurality of vehicle interior microphones 18 and the volume of the sound acquired by the vehicle exterior microphone 20, among the volumes output by the acoustic unit 34.

Figure 6A:
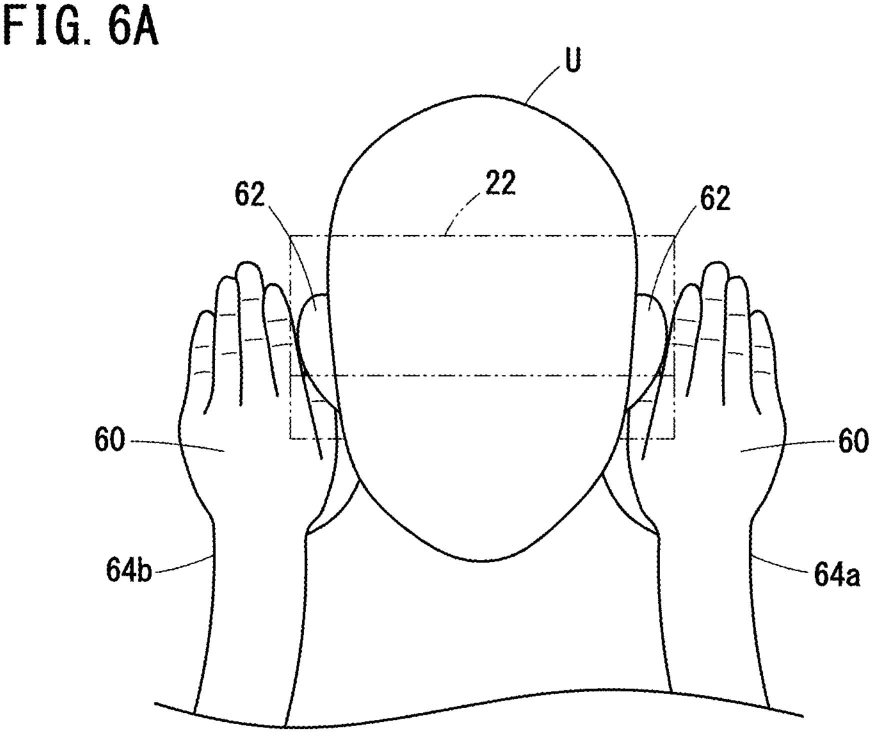
FIG. 6A is a diagram showing the user performing the first gesture with both hands.
Figure 6B:
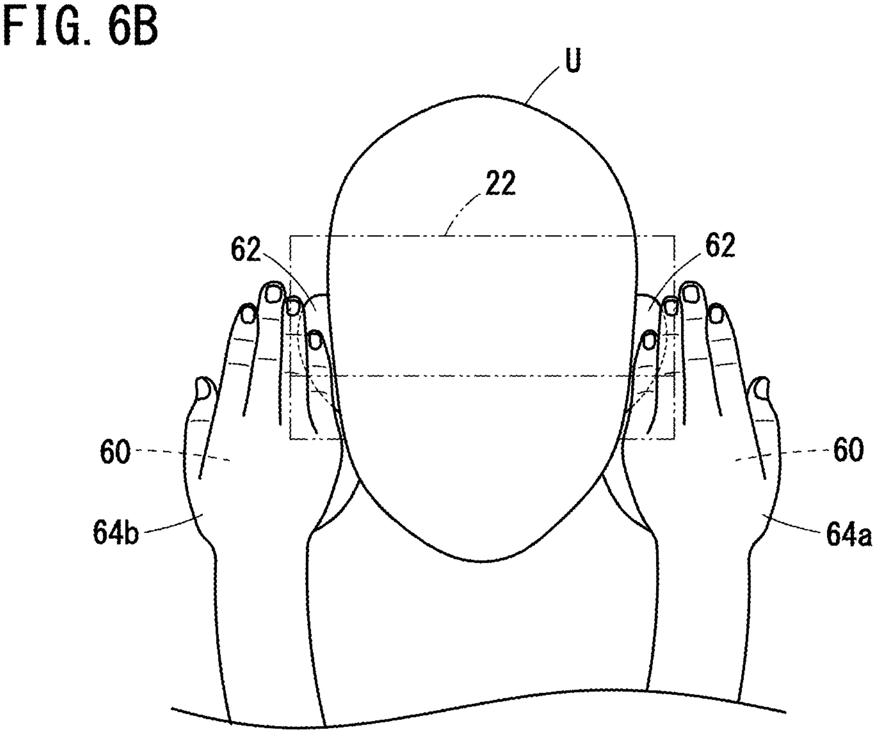
FIG. 6B is a diagram showing the user performing the second gesture with both hands.

As shown in FIG. 6A, the user U can perform the first gesture with both hands 64*a* and 64*b*. Further, as shown in FIG. 6B, the user U can perform the second gesture with the both hands 64*a* and 64*b*. In a case where the gesture shown in FIG. 6A or the gesture shown in FIG. 6B is detected by the detection unit 48, the volume control unit 52 selectively increases the volume of the sound acquired by the vehicle exterior microphone 20, among the volumes output by the acoustic unit 34.

Figure 7:
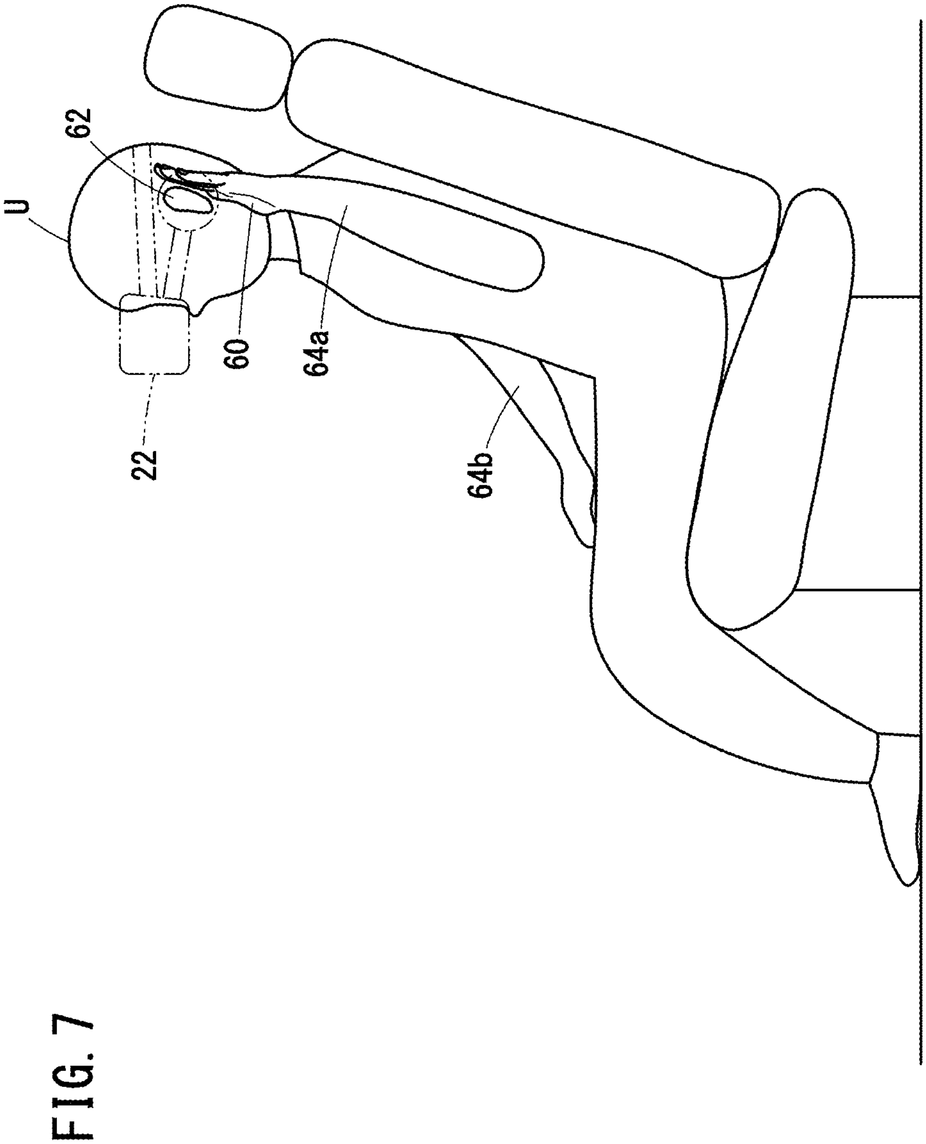
FIG. 7 is a diagram showing the user performing the first gesture with one hand and lowering the other hand.

As shown in FIG. 7, the user U can perform the first gesture or the second gesture with one hand 64*a* and lower the other hand 64*b*. In a case where the gesture shown in FIG. 7 is detected by the detection unit 48, the volume control unit 52 selectively increases the volume of the sound acquired by the vehicle interior microphone 18 located in the direction in which the palm 60 of the one hand 64*a* is directed, among the volumes output by the acoustic unit 34.

Figure 8:
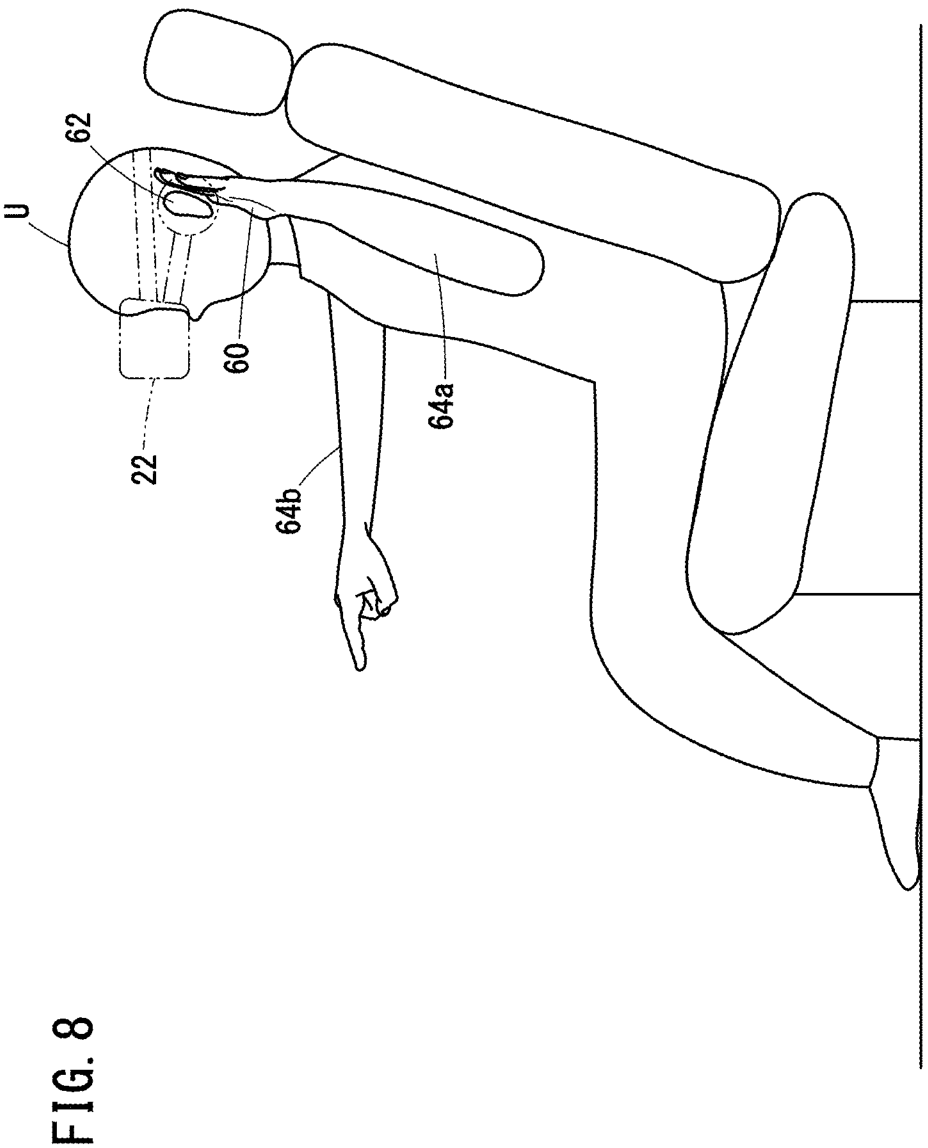
FIG. 8 is a diagram showing the user performing the first gesture with one hand and pointing in a direction with the other hand.

As shown in FIG. 8, the user U can perform the first gesture or the second gesture with the one hand 64*a* and point in a direction with the other hand 64*b*. In a case where the gesture shown in FIG. 8 is detected by the detection unit 48, the volume control unit 52 selectively increases the volume of the sound acquired by the vehicle interior microphone 18 located in the direction pointed by the other hand 64*b*, among the volumes output by the acoustic unit 34.

Figure 9:
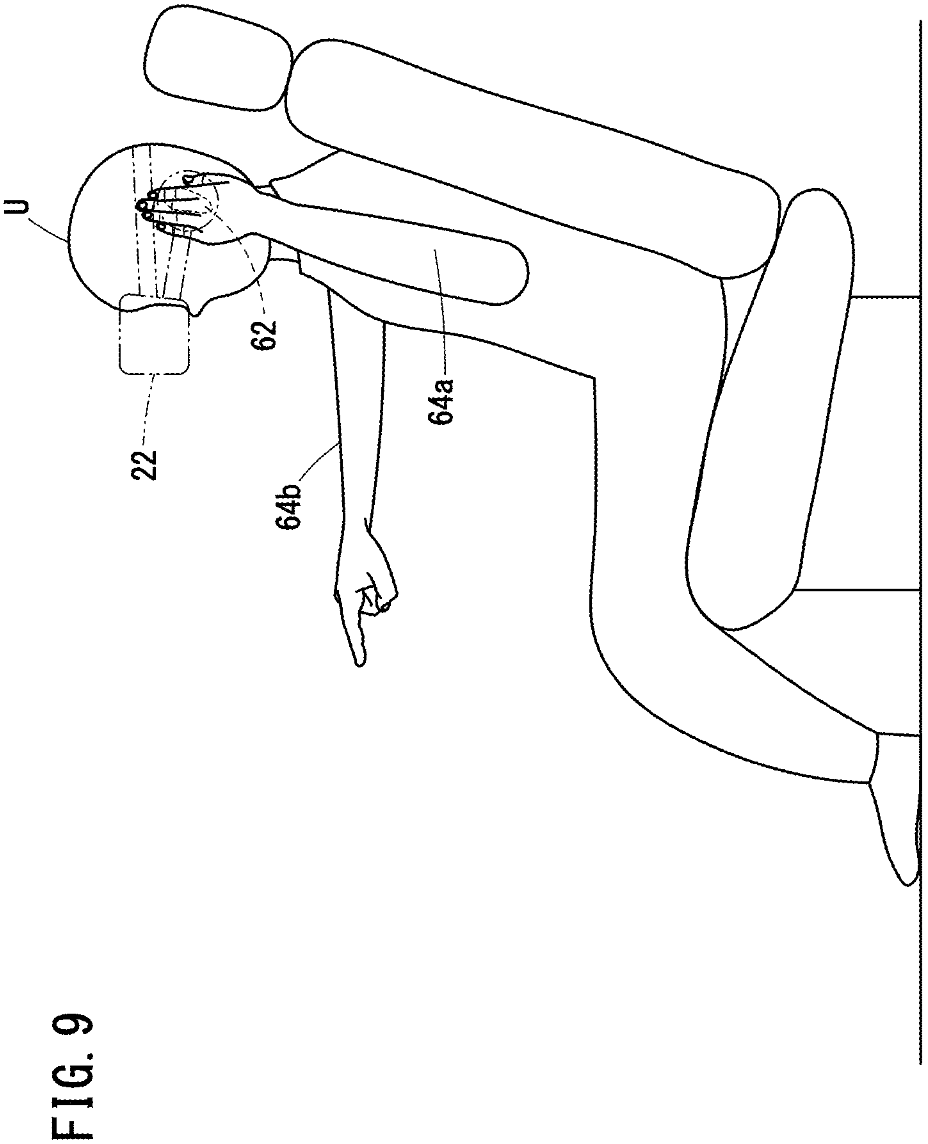
FIG. 9 is a diagram showing the user performing the third gesture with one hand and pointing in a direction with the other hand.

As shown in FIG. 9, the user U can perform the third gesture with the one hand 64*a* and point in a direction with the other hand 64*b*. In a case where the gesture shown in FIG. 9 is detected by the detection unit 48, the volume control unit 52 selectively decreases the volume of the sound acquired by the vehicle interior microphone 18 located in the direction pointed by the other hand 64*b*, among the volumes output by the acoustic unit 34.

4. Other Embodiment

The vehicle interior camera 14, the vehicle exterior camera 16, the vehicle interior microphones 18, and the vehicle exterior microphone 20 may communicate with a communication device of the vehicle 10. Further, the HMD 22 may communicate with the communication device of the vehicle 10. That is, the devices (the vehicle interior camera 14, the vehicle exterior camera 16, the vehicle interior microphones 18, and the vehicle exterior microphone 20) provided in the vehicle 10 and the HMD 22 may communicate with each other via the communication device of the vehicle 10.

5. Advantageous Effects

According to the present embodiment, the detection unit 48 detects a gesture performed by the user U, based on the image acquired by the vehicle interior camera 14 that constantly captures images of the interior of the vehicle cabin, and therefore can stably detect a gesture of the user U.

In a case where the volume of the head-mounted display 22 is adjusted by a device such as a remote controller, the sense of immersion of the user U may be impaired. However, according to the above configuration, since the volume of the head-mounted display 22 can be adjusted by the gesture of the user U, the sense of immersion of the user U is less likely to be impaired.

According to the above configuration, the head-mounted display 22 displays the display image corresponding to the image acquired by the vehicle exterior camera 16 that captures images of the periphery of the vehicle 10, and therefore, it is possible to suppress motion sickness of the user U.

As described above, according to the present embodiment, the head-mounted display 22 can be used satisfactorily in the vehicle cabin.

6. Supplementary Notes

The following supplementary notes are further disclosed in relation to the above-described embodiments.

Supplementary Note 1

The control system (12) of the present disclosure includes: the head-mounted display (22) worn by the user (U) riding in the vehicle (10), the head-mounted display being configured to provide the user with at least a display image corresponding to an image acquired by the vehicle exterior camera (16) provided in the vehicle and configured to capture an image of the periphery of the vehicle; the detection unit (48) configured to detect a gesture performed by the user, based on an image acquired by the vehicle interior camera (14) provided in the vehicle and configured to capture an image of the interior of the vehicle cabin; and the volume control unit (52) configured to execute control of adjusting the volume of the speaker (34) provided in the head-mounted display based on the gesture detected by the detection unit.

According to the above configuration, the detection unit detects a gesture performed by the user, based on the image acquired by the vehicle interior camera that constantly captures images of the interior of the vehicle cabin, and therefore can stably detect a gesture of the user.

According to the configuration, since the volume of the head-mounted display can be adjusted based on the gesture performed by the user, the sense of immersion of the user is less likely to be impaired.

According to the above configuration, the head-mounted display displays the display image corresponding to the image acquired by the vehicle exterior camera that captures images of the periphery of the vehicle, and therefore, it is possible to suppress motion sickness of the user.

As described above, according to the above configuration, the head-mounted display can be used satisfactorily in the vehicle cabin.

Supplementary Note 2

In the control system according to Supplementary Note 1, the volume control unit may increase the volume in a case where the detection unit detects the gesture of positioning the palm (60) around the ear (62) without covering the ear with the palm.

Supplementary Note 3

In the control system according to Supplementary Note 1 or 2, the volume control unit may decrease the volume in a case where the detection unit detects the gesture of covering the ear with the hand (64).

Supplementary Note 4

In the control system according to any one of Supplementary Notes 1 to 3, in a case where the detection unit detects the gesture of positioning the palm of the left hand (64*a*) around the left ear without covering the left ear with the palm of the left hand and positioning the palm of the right hand (64*b*) around the right ear without covering the right ear with the palm of the right hand, the volume control unit may selectively increase the volume of the sound acquired by the microphone (20) configured to acquire the sound outside the vehicle.

Supplementary Note 5

In the control system according to any one of Supplementary Notes 1 to 4, in a case where the detection unit detects the gesture of positioning the palm of one hand (64*a*) around the ear without covering the ear with the one hand and pointing in a direction with the other hand (64*b*), the volume control unit may selectively increase the volume of the sound from the direction pointed by the other hand.

Supplementary Note 6

In the control system according to Supplementary Note 2, the volume of the sound from the direction in which the palm is directed may be selectively increased.

According to the configurations of Supplementary Notes 2 to 6, since the user can adjust the volume based on a gesture instead of an operation of the device, the sense of immersion of the user is less likely to be impaired.

Supplementary Note 7

The head-mounted display of the present disclosure is worn by the user riding in the vehicle, and includes: the display unit (32) configured to provide the user with at least a display image corresponding to an image acquired by the vehicle exterior camera provided in the vehicle and configured to capture an image of the periphery of the vehicle; the speaker configured to provide the user with a sound; the detection unit configured to detect a gesture performed by the user, based on an image acquired by the vehicle interior camera provided in the vehicle and configured to capture an image of the interior of the vehicle cabin; and the volume control unit configured to execute control of adjusting the volume of the speaker based on the gesture detected by the detection unit.

According to the above configuration, the detection unit detects a gesture performed by the user, based on the image acquired by the vehicle interior camera that constantly captures images of the interior of the vehicle cabin, and therefore can stably detect a gesture of the user.

According to the configuration, since the volume of the head-mounted display can be adjusted based on the gesture performed by the user, the sense of immersion of the user is less likely to be impaired.

According to the above configuration, the head-mounted display displays the display image corresponding to the image acquired by the vehicle exterior camera that captures images of the periphery of the vehicle, and therefore, it is possible to suppress motion sickness of the user.

Although the present disclosure has been described in detail, the present disclosure is not limited to the above-described individual embodiments. Various additions, replacements, modifications, partial deletions, and the like can be made to these embodiments without departing from the gist of the present disclosure, or without departing from the essence of the present disclosure derived from the claims and equivalents thereof. Further, these embodiments can also be implemented in combination. For example, in the above-described embodiments, the order of operations and the order of processes are shown as examples, and are not limited to these. Furthermore, the same applies to a case where numerical values or mathematical expressions are used in the description of the above-described embodiments.

The invention claimed is:

1. A control system comprising:

a head-mounted display that is worn by a user riding in a vehicle, the head-mounted display being configured to provide the user with at least a display image corresponding to an image acquired by a vehicle exterior camera provided in the vehicle and configured to capture an image of a periphery of the vehicle; and one or more processors that execute computer-executable instructions stored in a memory, wherein the one or more processors execute the computer-executable instructions to cause the control system to:

detect a gesture performed by the user, based on an image acquired by a vehicle interior camera provided in the vehicle and configured to capture an image of an interior of a vehicle cabin; and execute control of adjusting a volume of a speaker provided in the head-mounted display, based on the gesture that has been detected.

2. The control system according to claim 1, wherein the one or more processors cause the control system to increase the volume in a case where a gesture of positioning a palm around an ear without covering the ear with the palm is detected.

3. The control system according to claim 2, wherein the one or more processors cause the control system to selectively increase the volume of a sound from a direction in which the palm is directed.

4. The control system according to claim 1, wherein the one or more processors cause the control system to decrease the volume in a case where a gesture of covering an ear with a hand is detected.

5. The control system according to claim 1, wherein the one or more processors cause the control system to selectively increase the volume of a sound acquired by a microphone configured to acquire a sound outside the vehicle, in a case where a gesture of positioning a palm of a left hand around a left ear without covering the left ear with the palm of the left hand and positioning a palm of a right hand around a right ear without covering the right ear with the palm of the right hand is detected.

6. The control system according to claim 1, wherein the one or more processors cause the control system to, in a case where a gesture of positioning a palm of one hand around an ear without covering the ear with the palm of the one hand and pointing in a direction with another hand is detected, selectively increase the volume of a sound from the direction pointed by the other hand.

7. A head-mounted display that is worn by a user riding in a vehicle, the head-mounted display comprising:

a display unit configured to provide the user with at least a display image corresponding to an image acquired by a vehicle exterior camera provided in the vehicle and configured to capture an image of a periphery of the vehicle;

a speaker configured to provide the user with a sound; and one or more processors that execute computer-executable instructions stored in a memory, wherein the one or more processors execute the computer-executable instructions to cause the head-mounted display to:

detect a gesture performed by the user, based on an image acquired by a vehicle interior camera provided in the vehicle and configured to capture an image of an interior of a vehicle cabin; and execute control of adjusting a volume of the speaker based on the gesture that has been detected.

* * * * *